United States Patent
Cai et al.

(10) Patent No.: US 8,195,209 B2
(45) Date of Patent: Jun. 5, 2012

(54) TEXT MESSAGING OVER AN EHRPD NETWORK

(75) Inventors: Yigang Cai, Naperville, IL (US); Suzann Hua, Lisle, IL (US)

(73) Assignee: Alcatel Lucent, Paris (FR)

( * ) Notice: Subject to any disclaimer, the term of this patent is extended or adjusted under 35 U.S.C. 154(b) by 92 days.

(21) Appl. No.: 12/830,932

(22) Filed: Jul. 6, 2010

(65) Prior Publication Data

US 2012/0009955 A1 Jan. 12, 2012

(51) Int. Cl.
*H04W 4/00* (2009.01)
(52) U.S. Cl. ............... 455/466; 455/432.2; 455/552.1
(58) Field of Classification Search .............. 455/466, 455/432.2, 552.1
See application file for complete search history.

(56) References Cited

U.S. PATENT DOCUMENTS

| 2007/0135146 | A1* | 6/2007 | Rezaiifar et al. | 455/466 |
| 2007/0254681 | A1* | 11/2007 | Horvath et al. | 455/466 |
| 2010/0027448 | A1* | 2/2010 | Puthiyandyil et al. | 370/310 |
| 2010/0167762 | A1 | 7/2010 | Pandey et al. | |
| 2010/0177629 | A1* | 7/2010 | Payyappilly et al. | 370/216 |
| 2010/0235890 | A1* | 9/2010 | Cakulev et al. | 726/5 |
| 2010/0317378 | A1* | 12/2010 | Fang et al. | 455/466 |
| 2011/0076982 | A1* | 3/2011 | Li et al. | 455/404.1 |
| 2011/0200010 | A1* | 8/2011 | Hu et al. | 370/331 |

FOREIGN PATENT DOCUMENTS

EP 2154846 2/2010

* cited by examiner

*Primary Examiner* — Barry Taylor
(74) *Attorney, Agent, or Firm* — Duft Bornsen & Fishman LLP

(57) ABSTRACT

Systems and methods are disclosed for providing text messaging over an eHRPD network. A text message gateway implemented in the eHRPD network receives a Mobile Originated (MO) text message from a mobile device that is registered with the eHRPD network, and identifies a network where the destination of the text message is registered. If the destination is registered in the eHRPD network, then the text message gateway identifies an HRPD Serving Gateway (HSGW) in the eHRPD network that is serving the destination. The text message gateway then forwards the MO text message to the HSGW for delivery of the MO text message directly to the destination.

20 Claims, 10 Drawing Sheets

US 8,195,209 B2

TEXT MESSAGING OVER AN EHRPD NETWORK

FIELD OF THE INVENTION

The invention is related to the field of communications and, in particular, to text messaging over an Evolved High Rate Packet Data (eHRPD) network.

BACKGROUND

Text messaging has become a very popular mode of communication in many wireless communication networks. One example of text messaging is Short Message Service (SMS), which is a communication protocol allowing the exchange of short text messages (i.e., 160 characters) between mobile devices. While the term "text message" traditionally referred to text-only messages sent using SMS, it has been extended to include multimedia messages, such as images, video, sound content, etc. The multimedia messages may be sent using Multimedia Message Service (MMS) protocol. Often times, mobile users more frequently use text messaging for communication than voice calls.

Text messaging is typically implemented over the voice portion of a mobile network. One type of mobile network is based on CDMA2000 standards, and is referred to herein as a CDMA network (or ANSI-41 network). A CDMA network uses CDMA channel access to send voice, data, and signaling between mobile phones and cell sites. The general CDMA2000 standards includes CDMA2000 1X for sending text messages. For example, a sender of a new text message enters one or more intended destinations for the message in a user device (e.g., a phone), and also enters the content of the message. The user device of the sender formats the text message into the ANSI signaling message, and sends the ANSI signaling message to a message center in the network over the appropriate signaling channels. One example of a typical message center is an SMS Center (SMSC). The SMSC then attempts to deliver the SMS message to its destination(s).

The CDMA 2000 standards also define a data portion of the mobile network, which is referred to as a CDMA 1X EV-DO (Evolved Data Only or Evolved Data Optimized) or a High-Rate Packet Data (HRPD) network. An HRPD network (also referred to as a 1xEV-DO network) is a 3G high-speed CDMA-based wireless data technology that allows for data rates up to 2.4 mbps. The trend for mobile networks is to evolve towards 4G technologies. One project within the 3rd Generation Partnership Project (3GPP, 3GPP2) is the Long Term Evolution (LTE), which is a 4G (or pre-4G) technology intended to reach data rates of 100 mbps or more. The architecture defined by this project is referred to as the Evolved Packet System (EPS). The EPS architecture comprehends E-UTRAN (Evolved UTRAN) on the access side and EPC (Evolved Packet Core) on the core side.

As networks evolve to 4G networks, the HRPD networks will evolve to LTE networks. In the mean time, the CDMA 2000 standards suggest an Evolved HRPD (eHRPD) network, which is a stopgap between the EV-DO network and the LTE network. The eHRPD network allows a network operator to upgrade an existing HRPD packet core network using elements of an EPC architecture. Additionally, an eHRPD network is an evolutionary path to an LTE network while also allowing for seamless service mobility (including seamless hand-offs) between the eHRPD network and the LTE network.

SUMMARY

Embodiments described herein provide a way of implementing text messaging in an eHRPD network. Previously, text messaging was not implemented in eHRPD networks. To overcome this limitation, the embodiments herein add a text message gateway to the eHRPD network that performs Mobile Originating (MO) and Mobile Terminating (MT) text messaging over the eHRPD network. Thus, network operators are able to offer the popular text messaging service and realize the revenues from the service.

One embodiment comprises a system in an eHRPD network for text messaging. The system includes a text message gateway implemented in the eHRPD network. The text message gateway receives an MO text message from a mobile device that is registered with the eHRPD network, and identifies a network where the destination of the text message is registered. For example, the destination may be registered in the eHRPD network, in an LTE network, in an IMS network, etc. If the destination is registered in the eHRPD network, then the text message gateway identifies an HRPD Serving Gateway (HSGW) in the eHRPD network that is serving the destination, and forwards the MO text message to the HSGW for delivery of the MO text message to the destination. The MO text message is not forwarded to a text message center (e.g., SMSC or MMSC) for store-and-forward processing, but is instead forwarded directly from the text message gateway to the destination through the HSGW.

In another embodiment, the text message gateway receives a Mobile Terminated (MT) text message sent to the mobile device. The text message gateway identifies an address for an HSGW in the eHRPD network that is serving the mobile device. The text message gateway also identifies a dynamic IP address assigned to the mobile device in the eHRPD network. Both the HSGW address and the dynamic IP address may be identified by querying a Home Subscriber Server (HSS). The text message gateway then forwards the MT text message to the mobile device based on the HSGW address and the dynamic IP address for the mobile device. The MT text message is not forwarded to a text message center for store-and-forward processing, but is instead forwarded directly from the text message gateway to the mobile device through the HSGW.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
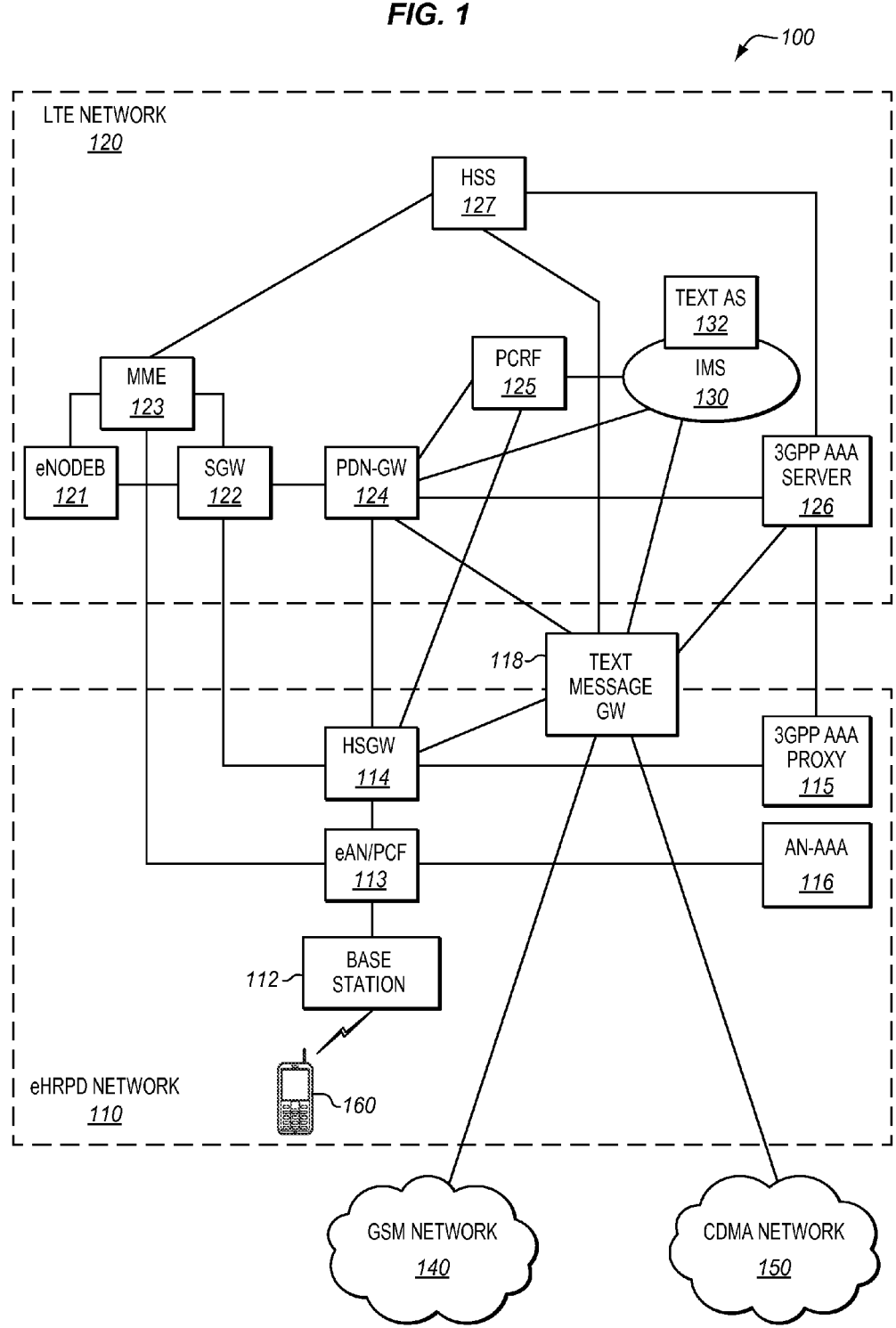
FIG. 1 illustrates a communication system in an exemplary embodiment.

FIG. 1 illustrates a communication system 100 in an exemplary embodiment. Communication system 100 includes multiple wireless communication networks, which are illustrated as an eHRPD network 110, an LTE network 120, an IP Multimedia Subsystem (IMS) network 130 (which is illustrated as part of LTE network 120), a GSM network 140, and a CDMA network 150 in this embodiment. The embodiments described below illustrate delivery of text messages to/from a mobile device 160 while receiving service from eHRPD network 110.

eHRPD network 110 includes one or more base stations 112, an evolved access network packet control function (eAN/PCF) 113, an HRPD serving gateway (HSGW) 114, a 3GPP Authentication, Authorization, and Accounting (AAA) proxy 115, and an access network AAA 116. In addition to these network elements, eHRPD network 110 further includes a newly-added text message gateway 118 that is operable to handle text messaging within eHRPD network 110, such as SMS messaging, MMS messaging, etc. Text message gateway 118 may also provide protocol interworking for text messages between other networks, such as GSM network 140 or CDMA network 150. eHRPD network 110 may include other network elements that are not shown for the sake of brevity.

LTE network 120 includes one or more base stations (eNODEB) 121, a serving gateway (SGW) 122, a Mobility Management Entity (MME) 123, a packet data network gateway (PDN-GW) 124, a Policy and Charging Rules Function (PCRF) 125, a 3GPP AAA server 126, a Home Subscriber Server (HSS) 127, and operator's IP services that are illustrated as an IMS network 130. IMS network 130 includes a text message application server (AS) 132. LTE network 120 may include other network elements that are not shown for the sake of brevity.

Assume for this embodiment that mobile device 160 enters the service area of eHRPD network 110. When mobile device 160 first accesses eHRPD network 110, it registers with eHRPD network 110 through 3GPP AAA proxy 115 and 3GPP AAA server 126. 3GPP AAA server 126 forwards registration information to HSS 127, which updates a subscriber profile for mobile device 160. After mobile device 160 is properly registered, mobile device 160 may access data services through eHRPD network 110.

By the addition of text message gateway 118, one of the data services available to mobile device 160 is text messaging. Thus, mobile device 160 may send or receive text messages over eHRPD network 110. When sending a text message (Mobile Originated), mobile device 160 encapsulates the text message in a proper signaling message (e.g., a Session Initiation Protocol (SIP) message), and transmits the text message to eHRPD network 110. The text message is initially received in eAN/PCF 113 through base station 112. eAN/PCF 113 then sends the text message to HSGW 114, which forwards the text message to text message gateway 118. Text message gateway 118 then operates in the following manner to deliver the MO text message.

Figure 2:
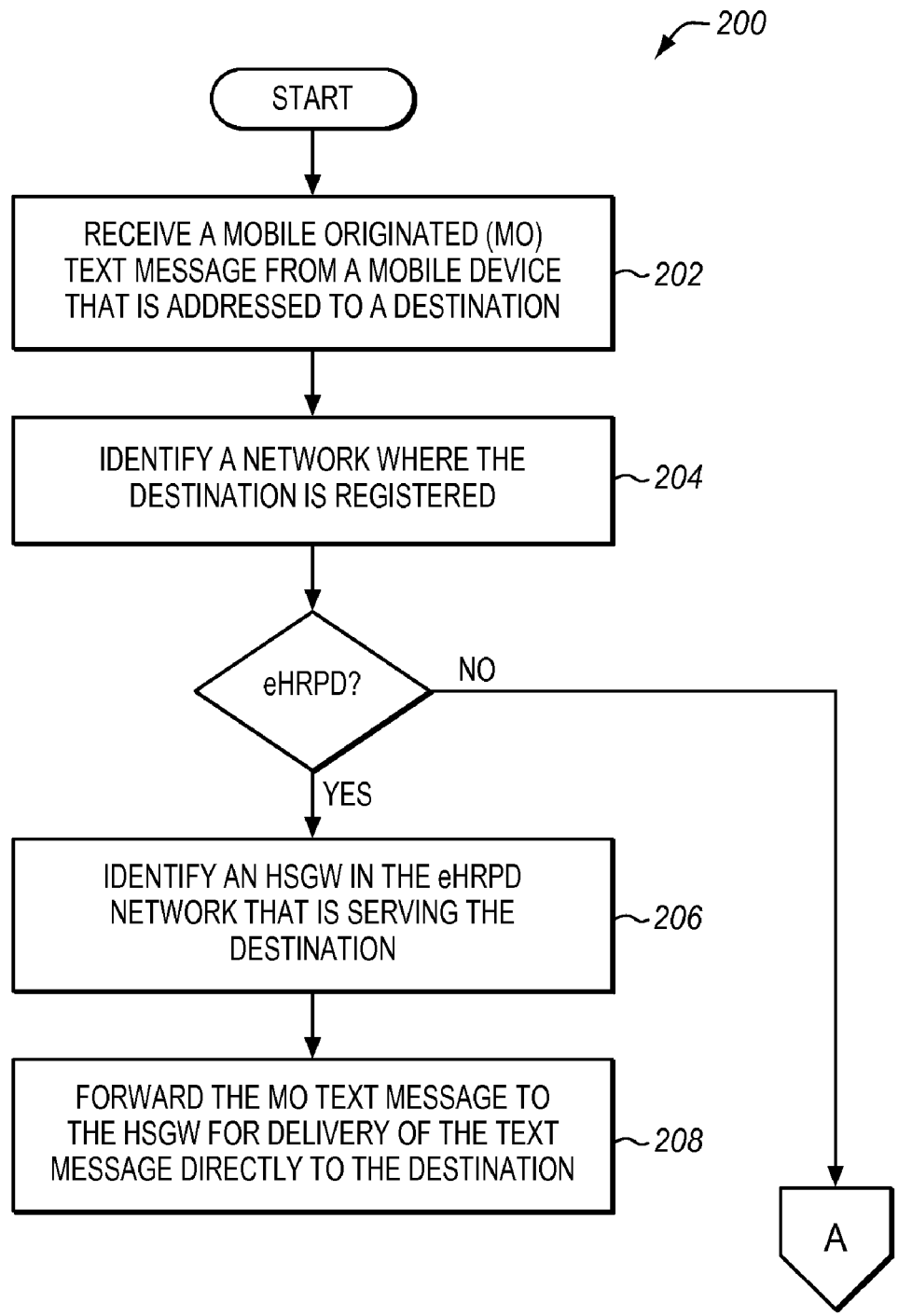
FIG. 2 is a flow chart illustrating a method of delivering a Mobile Originated (MO) text message from a mobile device over an eHRPD network in an exemplary embodiment.

FIG. 2 is a flow chart illustrating a method 200 of delivering a Mobile Originated (MO) text message from mobile device 160 over eHRPD network 110 in an exemplary embodiment. The steps of method 200 will be described with reference to communication system 100 in FIG. 1, but those skilled in the art will appreciate that method 200 may be performed in other networks and systems. The steps of the flow charts described herein are not all inclusive and may include other steps not shown. The steps may also be performed in an alternative order.

In step 202, text message gateway 118 receives the MO text message originating from mobile device 160 of the sender. The MO text message is addressed to a destination which is not shown in FIG. 1. The destination may refer to both a mobile device and an end user that is operating the mobile device. In step 204, text message gateway 118 identifies a network where the destination is registered and/or is receiving service. The destination may be registered in eHRPD network 110, in LTE network 120, in IMS network 130, in GSM network 140, in CDMA network 150, or another network not shown in FIG. 1. To identify where the destination is registered, text message gateway 118 may query HSS 127 with an identifier of the destination. If HSS 127 does not store information for the destination, then text message gateway 118 may query other subscriber databases to determine where the destination is registered.

If the destination is registered in eHRPD network 110, then text message gateway 118 identifies an HSGW in eHRPD network 110 that is serving the destination in step 206. Although one HSGW is illustrated in FIG. 1, eHRPD network 110 may have multiple HSGWs. The destination may be served by the same HSGW 114 that is serving the sender (mobile device 160), or may be served by a different HSGW that is not shown in FIG. 1. To identify the HSGW of the destination, text message gateway 118 may query HSS 127. As will be described in more detail below, one advance in the art described herein is that an HSGW address or HSGW ID is stored in HSS 127 for mobile devices that register with eHRPD network 110. In addition, dynamic IP addresses that are assigned to mobile devices in eHRPD network 110 are stored in HSS 127. Thus, if the destination has registered with eHRPD network 110, then HSS 127 stores the network address of the HSGW that is serving the destination and a dynamic IP address for the destination.

In step 208, text message gateway 118 forwards the MO text message to the HSGW that is serving the destination. The HSGW for the destination then delivers the text message to the destination. The text message in this embodiment is sent "directly" from text message gateway 118 to the destination, which means that text message gateway 118 does not forward the MO text message to a text message center (e.g., SMSC or MMSC) for delivery, and store-and-forward processing is not used for message delivery. Instead, text message gateway 118 delivers the text message directly to the destination through its HSGW without store-and-forward processing of a text message center.

Figure 3:
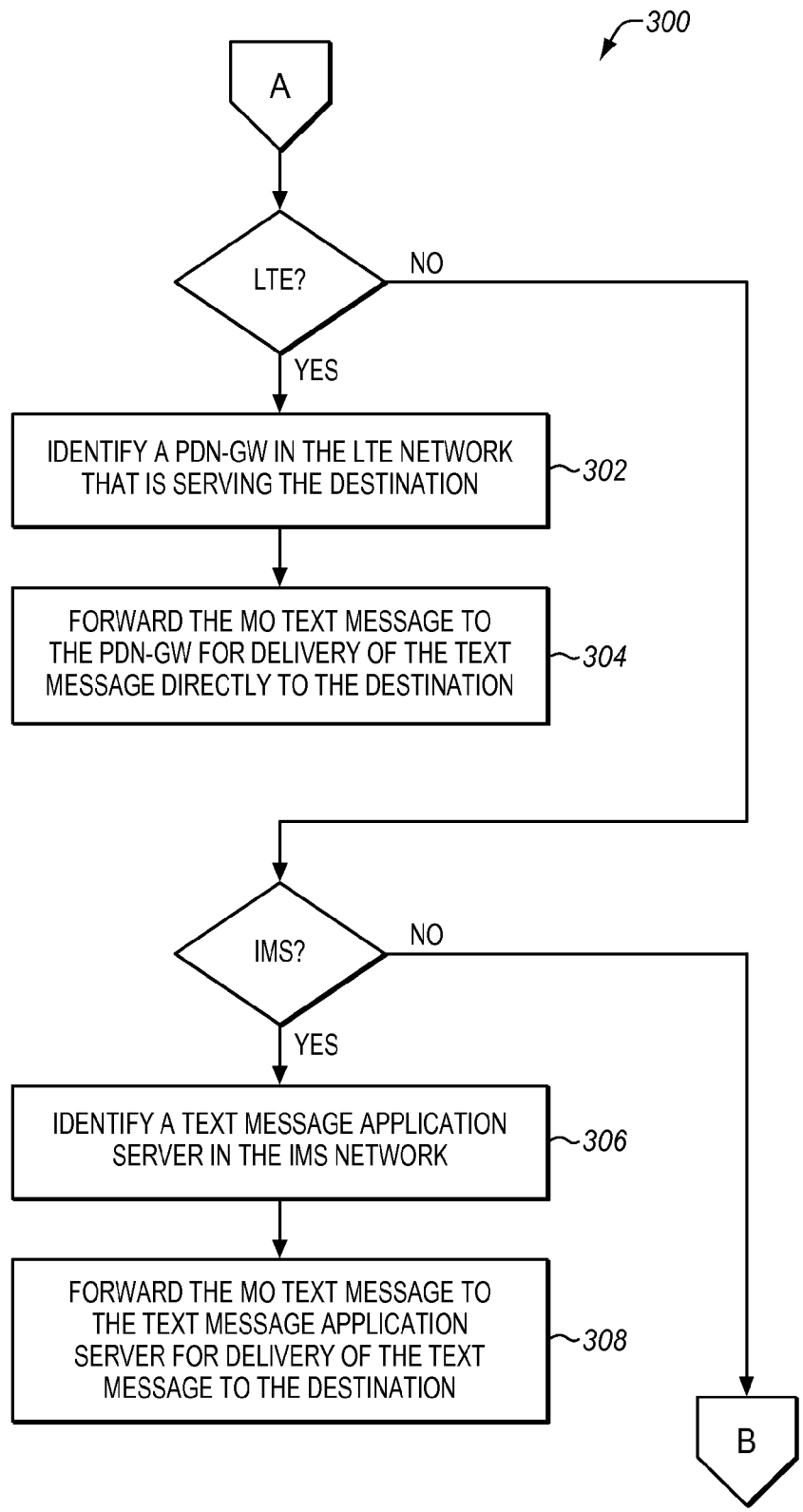
FIGS. 3-4 are flow charts illustrating a method of delivering the MO text message from the mobile device over another network in an exemplary embodiment.
Figure 4:
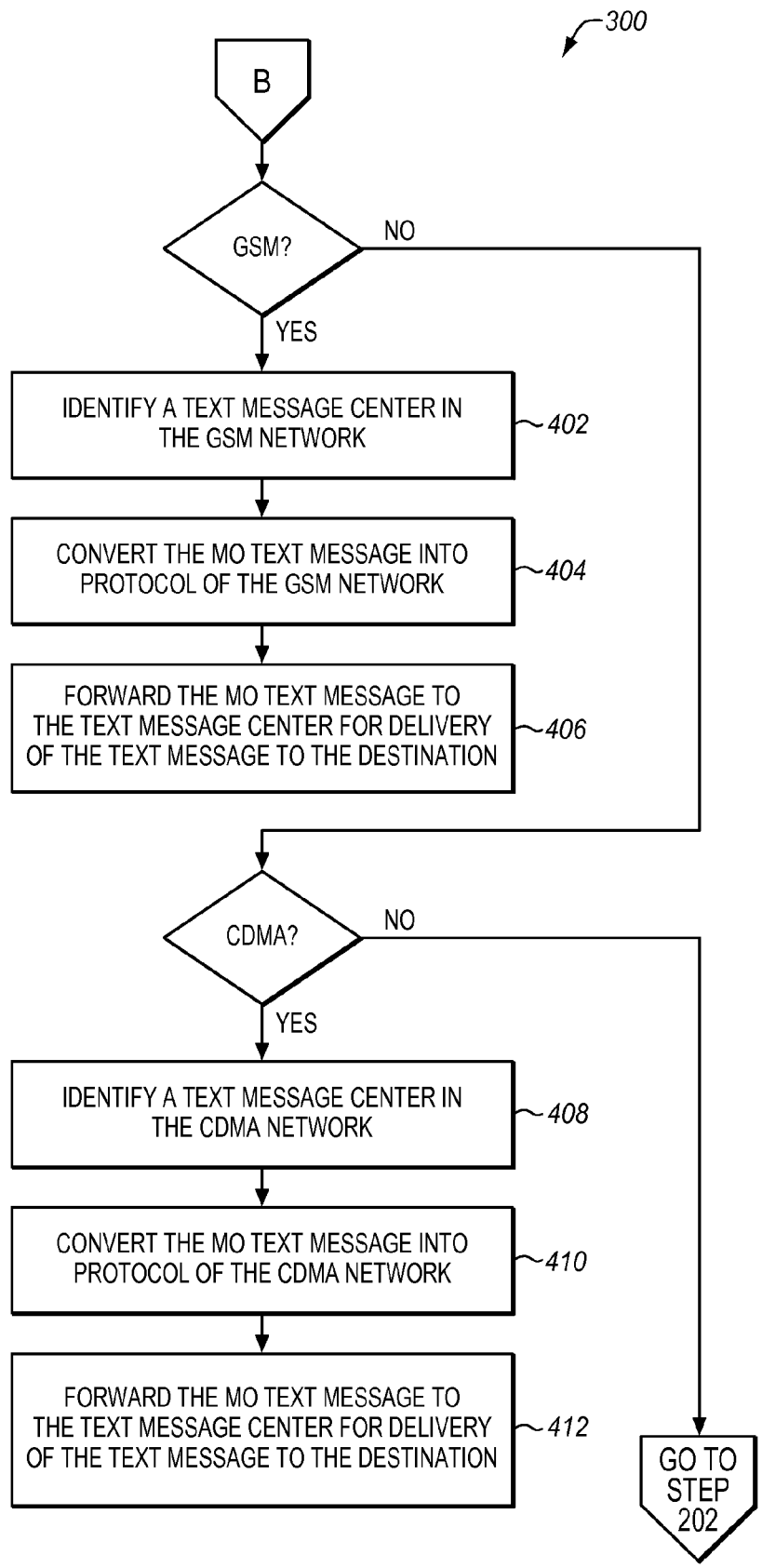

If the destination is registered in a network other than eHRPD network 110, then text message gateway 118 may operate as described in FIGS. 3-4 to deliver the MO text message. FIGS. 3-4 are flow charts illustrating a method 300 of delivering the MO text message from mobile device 160 over another network in an exemplary embodiment.

In FIG. 3, if the destination is registered in LTE network 120, then text message gateway 118 identifies a PDN-GW (e.g., PDN-GW 124) in LTE network 120 that is serving the destination in step 302. Text message gateway 118 then forwards the text message to the PDN-GW in step 304 for delivery of the text message to the destination via LTE network 120. As with delivery over eHRPD network 110, the MO text message in this embodiment is sent directly from text message gateway 118 to the destination through PDN-GW 124, which means that a text message center is not used for delivery. Text message gateway 118 does not send the MO text message to a message center for store-and-forward processing, but instead delivers the text message directly to the destination through PDN-GW 124 in LTE network 120.

If the destination is registered in IMS network 130, then text message gateway 118 identifies a text message application server 132 (or text message gateway) in IMS network 130 in step 306. Text message gateway 118 then forwards the text message to the text message application server 132 in step 308 for delivery of the text message to the destination via IMS network 130.

In FIG. 4, if the destination is registered in GSM network 140, then text message gateway 118 identifies a text message center (not shown) in GSM network 140 in step 402. The text message center in GSM network 140 may comprise an SMSC, an MMSC, or another type of text message center that performs store-and-forward processing for delivering text messages. Text message gateway 118 converts the text message into a protocol of GSM network 140 in step 404. For example, eHRPD network 110 may use SIP for text messaging, while GSM network 140 uses Mobile Application Part (MAP). Text message gateway 118 may thus convert the text message from SIP (e.g., a SIP MESSAGE) to MAP (e.g., a MAP mt-ForwardSM message). By doing so, the text message center in GSM network 140 will be able to process the text message in a normal fashion. Text message gateway 118 then forwards the text message to the text message center in step 406. The text message center then delivers the text message to the destination via GSM network 140.

If the destination is registered in CDMA network 150, then text message gateway 118 identifies a text message center (not shown) in CDMA network 150 in step 408. The text message center in CDMA network 150 may comprise an SMSC, an MMSC, or another type of text message center that performs store-and-forward processing for delivering text messages. Text message gateway 118 converts the text message into a protocol CDMA network 150 in step 410. For example, eHRPD network 110 may use SIP for text messaging, while CDMA network 140 uses ANSI. Text message gateway 118 may thus convert the text message from SIP to ANSI. By doing so, the text message center in CDMA network 150 will be able to process the text message in a normal fashion. Text message gateway 118 then forwards the text message to the text message center in step 412. The text message center then delivers the text message to the destination via CDMA network 150.

If the destination is registered in a network other than those described above, then text message gateway 118 may operate in a similar manner to identify a network element in the network of registration, and forward the text message to the identified network element to deliver the text message to the destination.

In addition to the MO scenario, eHRPD network 110 allows mobile device 160 to receive text messages. When receiving a text message (Mobile Terminated), the text message is encapsulated in the proper signaling message, and is forwarded to HSGW 114 that is serving mobile device 160 in eHRPD network 110. HSGW 114 then forwards the MT text message to text message gateway 118. Text message gateway 118 then operates in the following manner to deliver the MT text message to mobile device 160.

Figure 5:
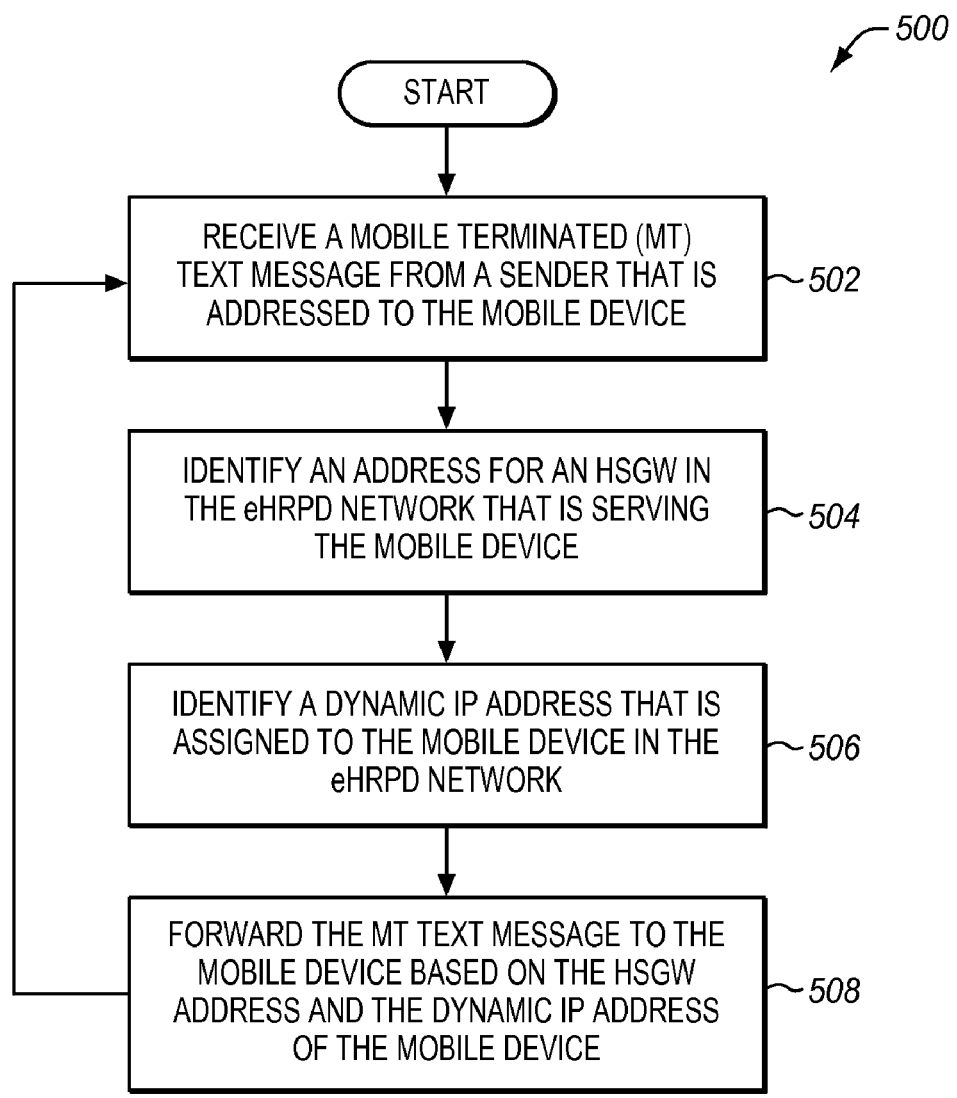
FIG. 5 is a flow chart illustrating a method of delivering a Mobile Terminated (MT) text message to a mobile device over an eHRPD network in an exemplary embodiment.

FIG. 5 is a flow chart illustrating a method 500 of delivering a Mobile Terminated (MT) text message to mobile device 160 over eHRPD network 110 in an exemplary embodiment. The steps of method 500 will be described with reference to communication system 100 in FIG. 1, but those skilled in the art will appreciate that method 500 may be performed in other networks and systems.

In step 502, text message gateway 118 receives the MT text message sent to mobile device 160. In step 504, text message gateway 118 identifies an address for HSGW 114 in eHRPD network 110 that is serving mobile device 160. In step 506, text message gateway 118 identifies a dynamic IP address that is assigned to mobile device 160 in eHRPD network 110. In both steps 504 and 506, text message gateway 118 may query HSS 127 for the address for HSGW 114 and the dynamic IP address for mobile device 160. This information is stored HSS 127 when mobile device 160 registers with eHRPD network 110. In step 508, text message gateway 118 forwards the MT text message to mobile device 160 based on the HSGW address and the dynamic IP address for mobile device 160.

As with the MO scenario, the MT text message in this embodiment is sent "directly" from text message gateway 118 to mobile device 160, which means that text message gateway 118 does not forward the MT text message to a text message center (e.g., SMSC or MMSC) for delivery, and store-and-forward processing is not used for message delivery. Instead, text message gateway 118 delivers the MT text message directly to mobile device through HSGW 114 without store-and-forward processing of a text message center.

The addition of text message gateway 118 in eHRPD network 110 advantageously allows for text messaging within eHRPD network 110 which was not previously available. As network operators transition their networks from HRPD to LTE, the network operators will be able to offer text messaging to their customers and realize higher revenues.

One feature in the above embodiments that allows text message gateway 118 to perform text messaging in eHRPD network 110 is that text message gateway 118 is able to identify routing information for the text message (MO or MT) by querying HSS 127. In FIG. 1, when mobile device 160 registers with eHRPD network 110, mobile device 160 is assigned an HSGW 114, and is also assigned a dynamic IP address. The address (or ID) for the assigned HSGW 114 and the dynamic IP address for mobile device 160 are both stored in HSS 127. For example, the HSGW address and dynamic IP address may be stored in a subscriber profile for mobile device 160. A similar process is performed when other mobiles (not shown) register with eHRPD network 110. Thus, HSS 127 stores the information needed by text message gateway 118 to route MO and MT messages within eHRPD network 110.

EXAMPLES

Figure 6:
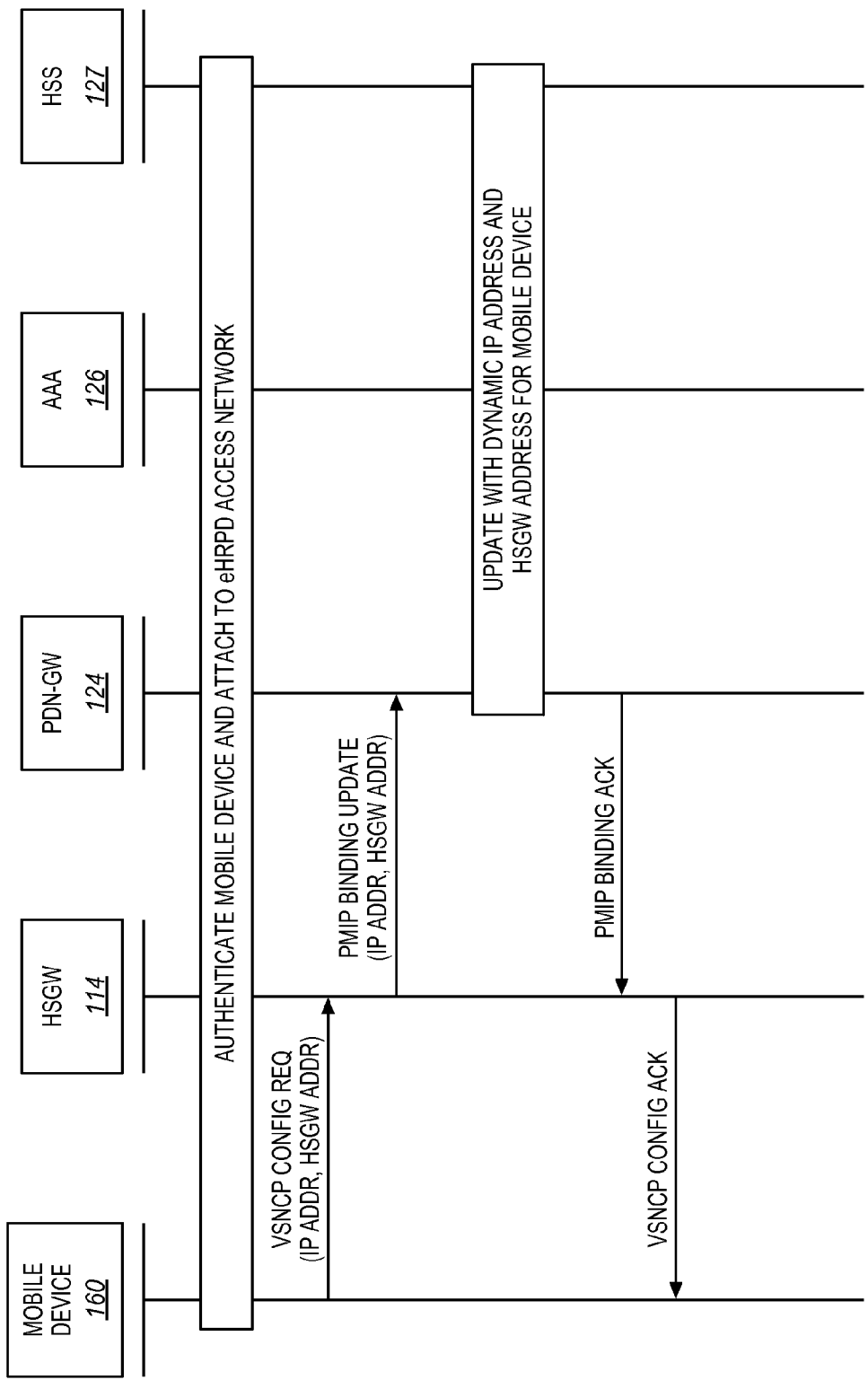
FIG. 6 is a message diagram illustrating registration of a mobile device with an eHRPD network in an exemplary embodiment.

FIG. 6 is a message diagram illustrating registration of mobile device 160 with eHRPD network 110 in an exemplary embodiment. To start, mobile device 160 exchanges messages with 3GPP AAA server 126 (through AAA proxy 115) to authenticate mobile device 160. 3GPP AAA server 126 also assigns a dynamic IP address to mobile device 160, and assigns an HSGW 114 to mobile device 160. The dynamic IP address and the HSGW address are provided to mobile device 160 after authentication. Next, mobile device 160 establishes a Point-to-Point Protocol (PPP) session in eHPRD network 110. To do so, mobile device 160 sends a Vendor-Specific Network Control Protocol (VSNCP) configuration request to HSGW 114. However, before sending the configuration request, mobile device 160 inserts its dynamic IP address and the HSGW address in the configuration request.

HSGW 114 then sends a Proxy Mobile IP (PMIP) binding update to PDN-GW 124. Before sending the binding update, HSGW 114 inserts the dynamic IP address and the HSGW address for mobile device 160 in the binding update. PDN-GW 124 then updates AAA server 126 and HSS 127 with the dynamic IP address and the HSGW address for mobile device 160 responsive to the message received form HSGW 114. HSS 127 thus stores the dynamic IP address and the HSGW address for mobile device 160, such as in a subscriber profile. PDN-GW 124 responds back to HSGW 114 with a PMIP binding acknowledgement. HSGW 114 responds back to mobile device 160 with a VSNCP configuration acknowledgement. The VSNCP configuration acknowledgement includes parameters for the PPP session of mobile device 160.

Figure 7:
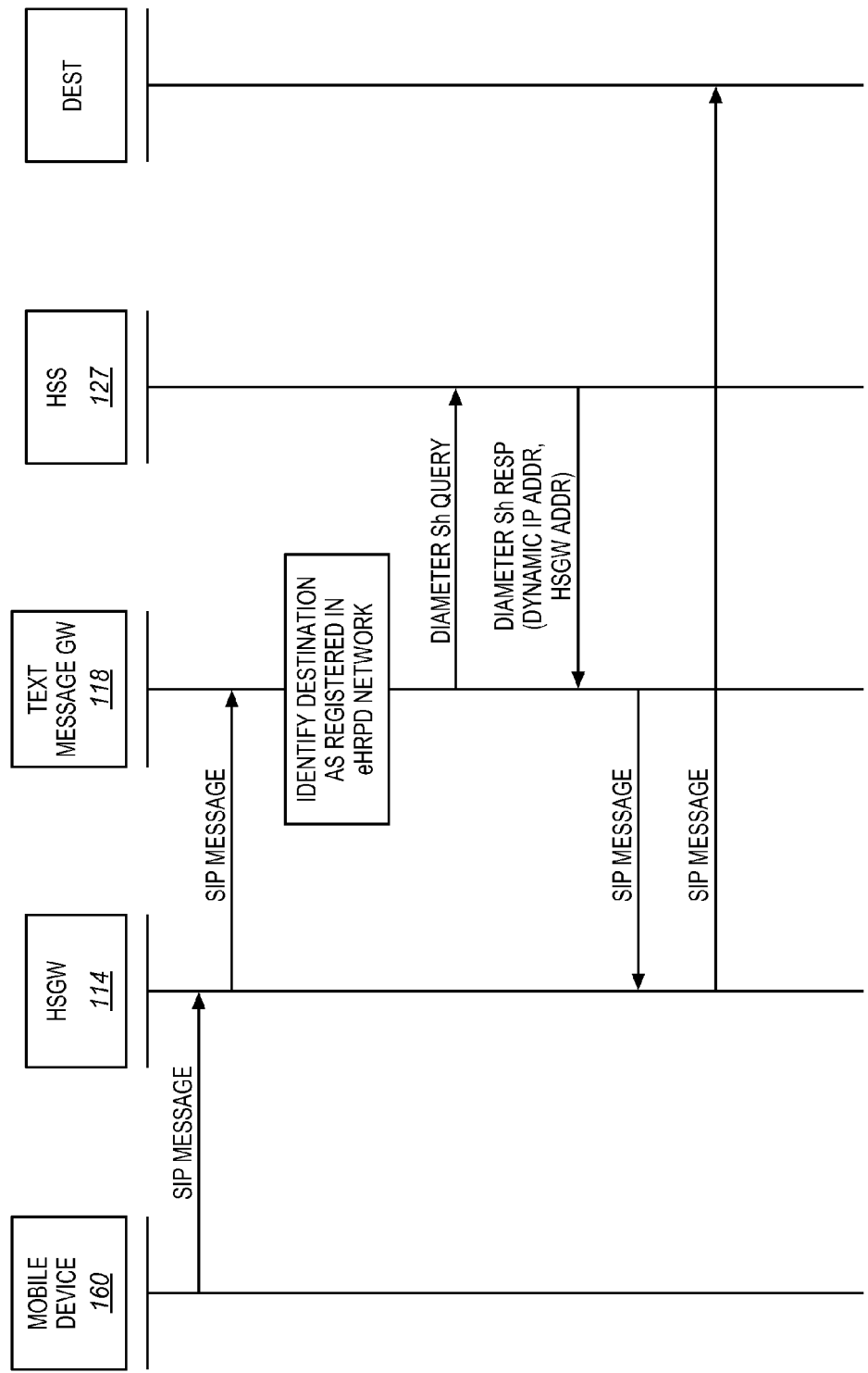
FIG. 7 is a message diagram illustrating delivery of a MO text message in an eHRPD network in an exemplary embodiment.

With mobile device 160 registered with eHRPD network 110, mobile device 160 may send or receive text messages. FIG. 7 is a message diagram illustrating delivery of a MO text message in eHRPD network 110 in an exemplary embodiment. Assume for this embodiment that mobile device 160 sends a text message to eHRPD network 110. To do so, mobile device 160 encapsulates the text message in a SIP MESSAGE, and sends the SIP MESSAGE to HSGW 114 through base station 112 and eAN/PCF 113. In response to the SIP MESSAGE, HSGW 114 identifies a routing address for text message gateway 118. For example, HSGW 114 may be pre-programmed with a routing address for text message gateway 118. HSGW 114 then routes the SIP MESSAGE, which includes the MO text message, to text message gateway 118.

In response to receiving the SIP MESSAGE, text message gateway 118 determines where the destination of the text message is registered. In this embodiment, the destination is registered in eHRPD network 110. Text message gateway 118 sends a Diameter Sh query to HSS 127 for routing information to the destination. As described in FIG. 6, when mobile devices register with eHRPD network 110, a dynamic IP address and HSGW address for the mobile devices are loaded into HSS 127. Thus, text message gateway 118 is able to query HSS 127 for the dynamic IP address and the HSGW address for the destination. In response to the query, HSS 127 sends a Diameter Sh response to text message gateway 118 that includes, among other data, the dynamic IP address and the HSGW address for the destination.

Assume for this embodiment that the HSGW address for the destination is HSGW 114 as shown in FIG. 1. To deliver the text message to the destination, text message gateway 118 forwards the SIP MESSAGE to HSGW 114 based on the HSGW address. HSGW 114 then forwards the SIP MESSAGE to the destination based on the dynamic IP address. The MO text message is not forwarded to a text message center (e.g., SMSC or MMSC) for store-and-forward processing, but is instead forwarded directly from text message gateway 118 to the destination through HSGW 114.

Figure 8:
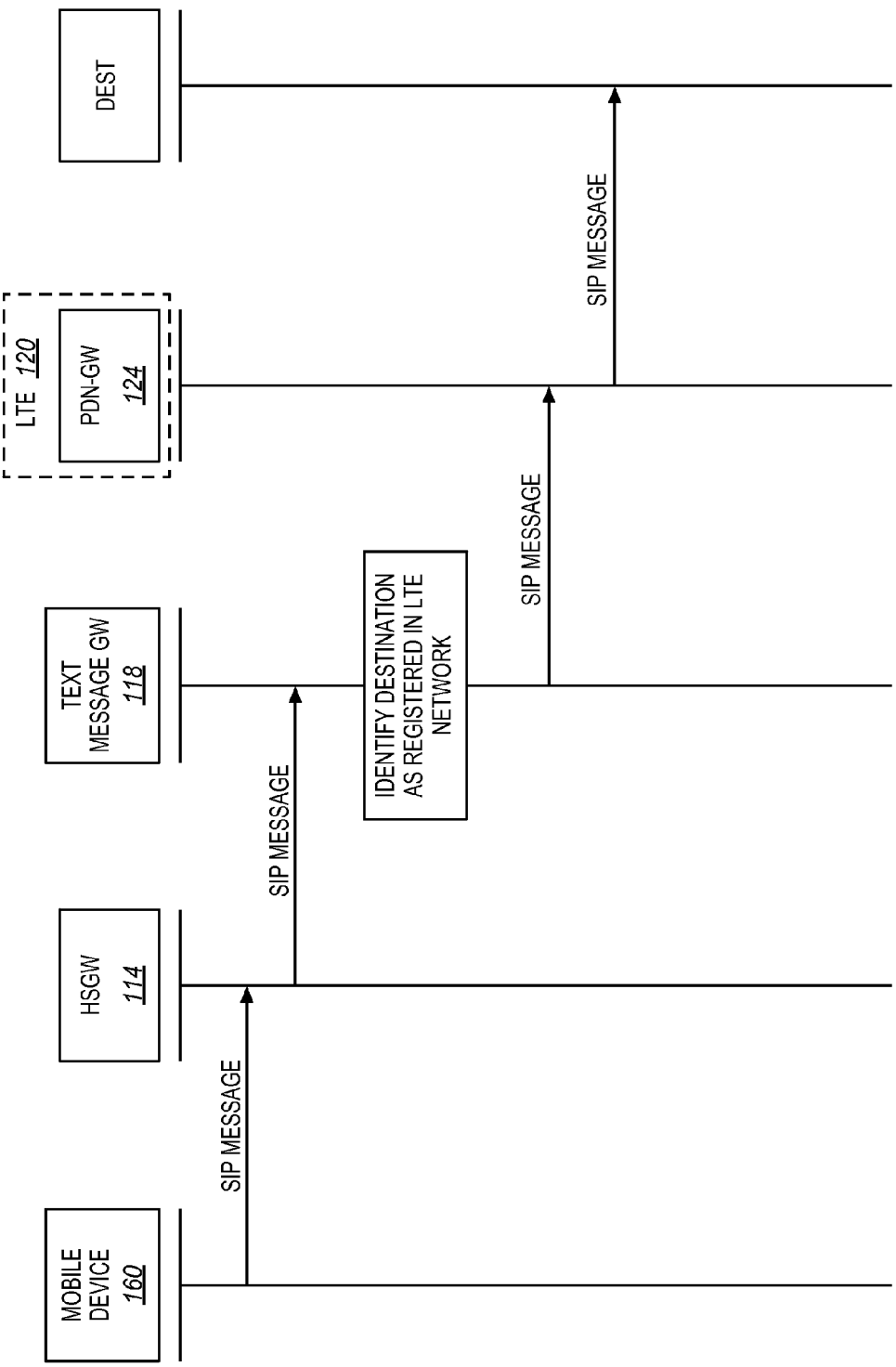
FIG. 8 is a message diagram illustrating delivery of a MO text message via an LTE network in an exemplary embodiment.

If the destination is registered in LTE network 120 rather than in eHRPD network 110, then text message gateway 118 operates as illustrated in FIG. 8. FIG. 8 is a message diagram illustrating delivery of a MO text message via LTE network 120 in an exemplary embodiment. The message flow is similar to FIG. 7 until text message gateway 118 determines that the destination is registered in LTE network 120. When this occurs, text message gateway 118 identifies the PDN-GW 124 for the destination, and forwards the SIP MESSAGE to PDN-GW 124. PDN-GW 124 then forwards the SIP MESSAGE to the destination. The MO text message is not forwarded to a text message center (e.g., SMSC or MMSC) for store-and-forward processing, but is instead forwarded directly from text message gateway 118 to the destination through PDN-GW 124.

Figure 9:
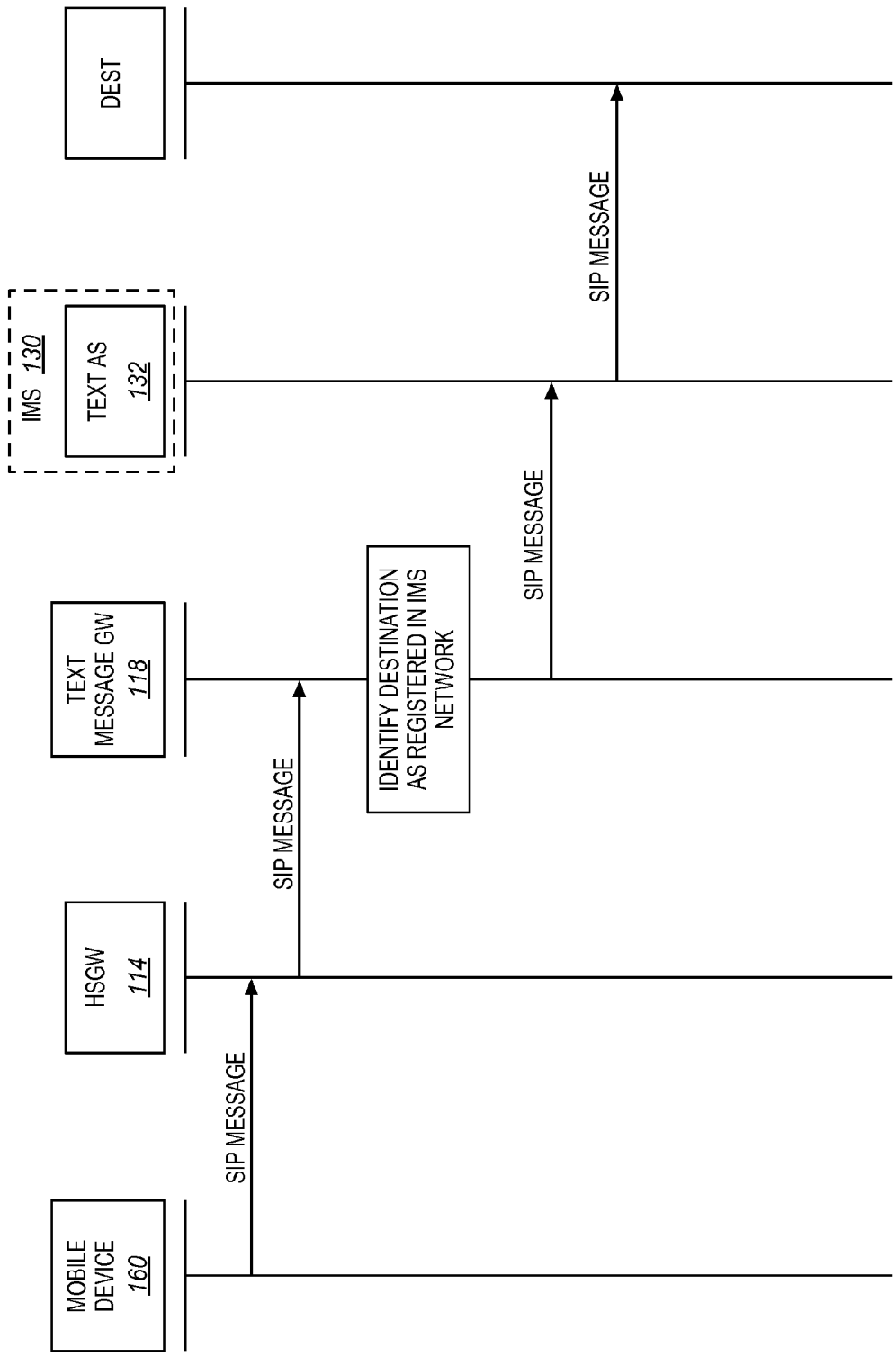
FIG. 9 is a message diagram illustrating delivery of a MO text message via an IMS network in an exemplary embodiment.

If the destination is registered in IMS network 130, then text message gateway 118 operates as illustrated in FIG. 9. FIG. 9 is a message diagram illustrating delivery of a MO text message via IMS network 130 in an exemplary embodiment. The message flow is similar to FIG. 7 until text message gateway 118 determines that the destination is registered in IMS network 130. When this occurs, text message gateway 118 identifies the text message application server (AS) 132 in IMS network 130, and forwards the SIP MESSAGE to text message AS 132. Text message AS 132 then forwards the SIP MESSAGE to the destination.

Figure 10:
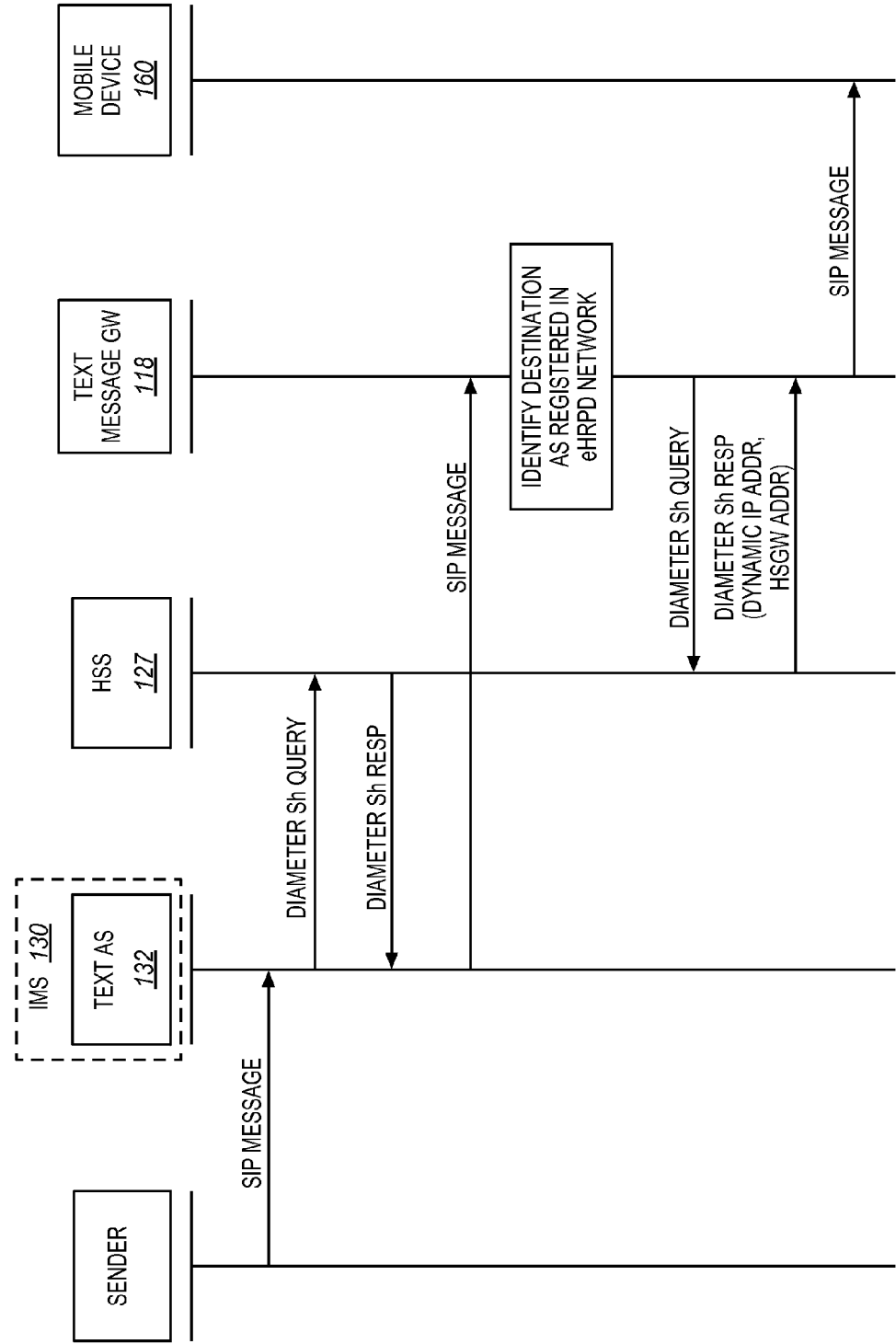
FIG. 10 is a message diagram illustrating delivery of a MT text message in an eHRPD network in an exemplary embodiment.

FIG. 10 is a message diagram illustrating delivery of a MT text message in eHRPD network 110 in an exemplary embodiment. Assume for this embodiment that a sender sends to a text message that is destined for mobile device 160. The MT text message is encapsulated in a SIP MESSAGE that is received by text message AS 132 in IMS network 130. In response to receiving the SIP MESSAGE, text message AS 132 determines where the destination of the text message is registered. Text message AS 132 sends a Diameter Sh query to HSS 127 for routing information to the destination. In response to the query, HSS 127 sends a Diameter Sh response to text message AS 132 indicating that the destination (i.e., mobile device 160) is registered in eHRPD network 110. Text message AS 132 then forwards the SIP MESSAGE to text message gateway 118.

In response to receiving the SIP MESSAGE, text message gateway 118 determines routing information for the destination. Thus, text message gateway 118 sends a Diameter Sh query to HSS 127 for routing information to the destination. In response to the query, HSS 127 sends a Diameter Sh response to text message gateway 118 that includes, among other data, the dynamic IP address and the HSGW address for mobile device 160. Text message gateway 118 then forwards the SIP MESSAGE to mobile device 160 through HSGW 114 (not shown in FIG. 10) based on the HSGW address and the dynamic IP address. As with the MO scenario, the MT text message is not forwarded to a text message center (e.g., SMSC or MMSC) for store-and-forward processing, but is instead forwarded directly from text message gateway 118 to mobile device 160 through HSGW 114.

If delivery of the MT text message fails in FIG. 10, then text message gateway 118 may attempt one or more retries after a time period. If the retries are unsuccessful, then text message gateway 118 may turn to LTE network 120, IMS network 130, GSM network 140, or CDMA network 150 as a failover. For example, if delivery of the MT text message fails in FIG. 10, then text message gateway 118 may operate much like in FIGS. 8-9 for the MO scenario. More particularly, text message gateway 118 as shown in FIG. 1 determines where mobile device 160 is registered (e.g., LTE, IMS, etc). If mobile device 160 is registered in LTE network 120, then text message gateway 118 identifies the PDN-GW 124 for mobile device 160, and forwards the SIP MESSAGE to PDN-GW 124. PDN-GW 124 then forwards the SIP MESSAGE to mobile device 160. Thus, the failover in this case is delivery through LTE network 120.

If mobile device 160 is registered in IMS network 130, then text message gateway 118 identifies the text message application server (AS) 132 in IMS network 130, and forwards the SIP MESSAGE to text message AS 132. Text message AS 132 then forwards the SIP MESSAGE to mobile device 160. Thus, the failover in this case is delivery through IMS network 130. Text message gateway 118 may use other networks as a failover to deliver the MT text message to mobile device 160.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A system comprising:
a text message gateway implemented in an evolved high rate packet data (eHRPD) network;
the text message gateway operable to receive a Mobile Originated (MO) text message from a mobile device that is registered with the eHRPD network, and to identify a network where a destination of the MO text message is registered;
if the destination of the MO text message is registered in the eHRPD network, then the text message gateway is further operable to identify an HRPD Serving Gateway (HSGW) in the eHRPD network that is serving the destination, and to forward the MO text message to the HSGW for delivery of the MO text message directly to the destination.

2. The system of claim 1 wherein:
the text message gateway is further operable to query a Home Subscriber Server (HSS) to identify the HSGW that is serving the destination.

3. The system of claim 2 wherein:
the text message gateway is further operable to transmit a Diameter Sh query to the HSS requesting an address for the HSGW that is serving the destination and requesting a dynamic IP address that is assigned to the destination in the eHRPD network.

4. The system of claim 1 wherein:
if the destination is registered in a Long Term Evolution (LTE) network, then the text message gateway is further operable to identify a Packet Data Network Gateway (PDN-GW) in the LTE network that is serving the destination, and to forward the MO text message to the PDN-GW for delivery of the MO text message directly to the destination via the LTE network.

5. The system of claim 1 wherein:
if the destination is registered in an IP Multimedia Subsystem (IMS) network, then the text message gateway is further operable to identify a text message application server in the IMS network, and to forward the MO text message to the text message application server for delivery of the MO text message to the destination via the IMS network.

6. The system of claim 1 wherein:
if the destination is registered in a Global System for Mobile Communications (GSM) network, then the text message gateway is further operable to identify a text message center in the GSM network, to translate the MO text message to a signaling protocol used in the GSM network, and to forward the MO text message to the text message center for delivery of the MO text message to the destination via the GSM network.

7. The system of claim 1 wherein:
if the destination is registered in a Code Division Multiple Access (CDMA) network, then the text message gateway is further operable to identify a text message center in the CDMA network, to translate the MO text message to a signaling protocol used in the CDMA network, and to forward the MO text message to the text message center for delivery of the MO text message to the destination.

8. The system of claim 1 wherein:
the text message gateway is further operable to receive a Mobile Terminated (MT) text message addressed to the mobile device, to identify an address for an HSGW in the eHRPD network that is serving the mobile device, to identify a dynamic IP address that is assigned to the mobile device in the eHRPD network, and to forward the MT text message directly to the mobile device based on the HSGW address and the dynamic IP address for the mobile device.

9. The system of claim 1 further comprising:
the HSGW of the eHRPD network operable to receive a configuration request from the mobile device for a Point-to-Point Protocol (PPP) session over the eHRPD network, to process the configuration request to identify a dynamic IP address assigned to the mobile device in the eHRPD network, and to send a message to an LTE network that includes the dynamic IP address for the mobile device and an address for the HSGW that is assigned to the mobile device to allow a Home Subscriber Server (HSS) to store the addresses.

10. A method of providing text messaging in an evolved high rate packet data (eHRPD) network, the method comprising:
receiving a Mobile Originated (MO) text message in a text message gateway from a mobile device that is registered with the eHRPD network;

identifying a network where a destination of the MO text message is registered;
if the destination of the MO text message is registered in the eHRPD network, then:
identifying an HRPD Serving Gateway (HSGW) in the eHRPD network that is serving the destination; and
forwarding the MO text message from the text message gateway to the HSGW for delivery of the MO text message directly to the destination.

11. The method of claim 10 wherein identifying the HSGW comprises:
querying a Home Subscriber Server (HSS) to identify the HSGW that is serving the destination.

12. The method of claim 11 wherein querying the HSS comprises:
transmitting a Diameter Sh query to the HSS requesting an address for the HSGW that is serving the destination and requesting a dynamic IP address that is assigned to the destination in the eHRPD network.

13. The method of claim 10 wherein:
if the destination is registered in a Long Term Evolution (LTE) network, then:
identifying a Packet Data Network Gateway (PDN-GW) in the LTE network that is serving the destination; and
forwarding the MO text message from the text message gateway to the PDN-GW for delivery of the MO text message directly to the destination via the LTE network.

14. The method of claim 10 wherein:
if the destination is registered in an IP Multimedia Subsystem (IMS) network, then:
identifying a text message application server in the IMS network; and
forwarding the MO text message from the text message gateway to the text message application server for delivery of the MO text message to the destination via the IMS network.

15. The method of claim 10 wherein:
if the destination is registered in a Global System for Mobile Communications (GSM) network, then:
identifying a text message center in the GSM network;
translating the MO text message to a signaling protocol used in the GSM network; and
forwarding the MO text message from the text message gateway to the text message center for delivery of the MO text message to the destination via the GSM network.

16. The method of claim 10 wherein:
if the destination is registered in a Code Division Multiple Access (CDMA) network, then:
identifying a text message center in the CDMA network;
translating the MO text message to a signaling protocol used in the CDMA network; and
forwarding the MO text message from the text message gateway to the text message center for delivery of the MO text message to the destination.

17. The method of claim 10 further comprising:
receiving a Mobile Terminated (MT) text message in the text message gateway that is addressed to the mobile device;
identifying an address for an HSGW in the eHRPD network that is serving the mobile device;
identifying a dynamic IP address that is assigned to the mobile device in the eHRPD network; and
forwarding the MT text message to the mobile device based on the HSGW address and the dynamic IP address for the mobile device.

18. The method of claim 10 further comprising:
receiving a configuration request in the HSGW of the eHRPD network from the mobile device for a Point-to-Point Protocol (PPP) session over the eHRPD network;
processing the configuration request to identify a dynamic IP address assigned to the mobile device in the eHRPD network; and
sending a message to an LTE network that includes the dynamic IP address for the mobile device and an address for the HSGW that is assigned to the mobile device to allow a Home Subscriber Server (HSS) to store the addresses.

19. A system comprising:
a text message gateway implemented in an evolved high rate packet data (eHRPD) network;
the text message gateway operable to receive a Mobile Terminated (MT) text message addressed to a mobile device that is registered with the eHRPD network, to identify an address for an HRPD Serving Gateway (HSGW) in the eHRPD network that is serving the mobile device, to identify a dynamic IP address that is assigned to the mobile device in the eHRPD network, and to forward the MT text message to the mobile device directly based on the HSGW address and the dynamic IP address for the mobile device.

20. The system of claim 19 wherein:
the text message gateway is further operable to transmit a Diameter Sh query to a Home Subscriber Server (HSS) requesting an address for the HSGW that is serving the mobile device and requesting a dynamic IP address that is assigned to the mobile device in the eHRPD network.

* * * * *